UNITED STATES PATENT OFFICE

WILLIAM JACKSON POPE, OF CAMBRIDGE, ENGLAND

GOLD SUCCINIMIDE COMPOUND AND PROCESS OF MAKING THE SAME

No Drawing. Application filed October 11, 1930, Serial No. 488,186, and in Great Britain July 19, 1929.

The invention relates to the manufacture of gold compounds of succinimide, which can be used as drugs when it is desirable to administer gold compounds in which the gold is not in the form of the auric or aurous ion.

The compounds in question are obtained by the interaction of gold hydroxide or chloroauric acid or one of their salts, or fulminating gold, with succinimide and a base at a suitable temperature in presence, when necessary, of a solvent. The composition of the resulting compound can be varied by varying the temperature and the proportions of the reacting substances and solvents. The compounds obtained are of the nature of so-called co-ordinated gold compounds and in stating their composition it is convenient to use the conventional method of formulating the compositions of the co-ordinated metallic compounds, without, however, binding myself to the accuracy of such method of formulation.

Using the method of manufacture stated above in general terms, the following gold derivatives of succinimide, amongst others, have been prepared:—

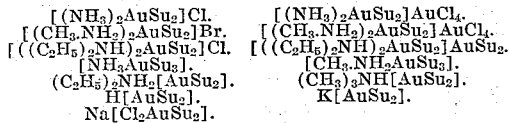

In the above formula the symbol Su stands for the succinimide residue:

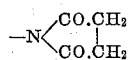

It will be noted that in certain of the above compounds the gold is present as a constituent of a basic ion, such as the co-ordinated group, $[(NH_3)_2AuSu_2]$. In others it is present as a constituent of a non-electrolyte, such as the compound $[NH_3AuSu_3]$. In others again it is present as a constituent of an acidic ion, such as the co-ordinated group $[AuSu_2]$ or $[Cl_2AuSu_2]$.

It is perhaps desirable to note that water or other solvent of crystallization is not included in the above formulæ.

By the present invention it is possible to obtain for the first time gold derivatives of succinimide, and it is to be understood that the scope of the invention is intended to embrace all such derivatives obtained by any of the methods above described or their obvious chemical equivalents.

The following examples will further illustrate how the invention may be carried out in practice, but the invention is not limited to these examples.

*Example 1.*—Preparation and properties of the compound $[(NH_3)_2AuSu_2]Cl$.

A mixture of chloroauric acid (=3 g. of metallic gold), succinimide, and 20 cc. of alcohol is treated with sufficient aqueous ammonia to neutralize the acid present. Heat is then applied, if necessary, to effect complete dissolution of the succinimide. The remainder of the base, making 6 cc. of ammonia ($d=.880$) in all, is then added drop by drop. The whole is set aside to crystallize, and the crude product filtered off. This is ground up with 15 cc. of cold water, which extracts a quantity of more soluble products, leaving 5 g. of the salt, $[(NH_3)_2AuSu_2]Cl$. This is soluble to the extent of 1–2% in cold water; it dissolves readily in boiling water containing a little succinimide, but only a small amount crystallizes out unchanged, the rest being transformed into other compounds. The pure chloride forms characteristic obliquely tuncated water-clear prisms.

*Example 2.*—The aurichloride,

is prepared by double decomposition, using theoretical quantities of the chloride described in Example 1 and of sodium aurichloride in water. It forms bright yellow prisms, which are almost insoluble in water.

*Example 3.*—Preparation and properties of the compound $[(CH_3NH_2)_2AuSu_2]Cl$.

This preparation is carried out in the same manner as in Example 1, except that 15 cc. of alcohol is used as the solvent and 9 g. of 33% aqueous methylamine replaces the ammonia. The crude product is more soluble in water (8–10%) than is the corresponding ammonia analogue. The bromide,

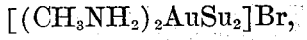

and the aurichloride are sparingly soluble salts, easily obtained pure by double decomposition from the chloride.

*Example 4.*—Preparation and properties of the compound $[NHEt_2)_2AuSu_2]Cl$.

This compound is prepared as described for the ammonia derivative above, except that 50 cc. of alcohol is used as the solvent and the ammonia is replaced by 6 cc. of anhydrous diethylamine. The crude product is washed with 20 cc. of water (filtrate A). The residue is practically pure chloride, $[(NHEt_2)_2AuSu_2]Cl$, weight 4.35 g. It is soluble in 30 parts of cold, and 12.5 parts of hot water and separates from the latter on cooling in needles. The corresponding bromide, thiocyanate, and aurichloride are sparingly soluble compounds formed by double decomposition, using the theoretical quantities. The filtrate A (above) deposits on standing massive colourless crystals which consists of the aurosuccinimide of the complex ion, $[(NHEt_2)_2AuSu_2][AuSu_2]$. The filtrate A also contains diethylamine aurosuccinimide. In order to obtain this compound in quantity the method of preparation is somewhat altered. The chloroauric acid, succinimide, and alcohol are heated to boiling and 4 g. of diethylamine is added. The chloride, $[(NHEt_2)_2AuSu_2]Cl$, which is precipitated, is filtered from the hot solution which is then treated with a further 4 cc. of diethylamine. The lustrous leaflets which separate on cooling may be recrystallized from alcohol giving pure diethylamine aurosuccinimide, $NHEt_2.HAuSu_2$.

*Example 5.*—(i) Preparation and properties of the compound $[NH_3AuSu_3]$.

The substance is obtained by boiling a solution of 1 g. of the compound

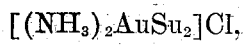
$$[(NH_3)_2AuSu_2]Cl,$$

and 1 g. of succinimide in 5 cc. of water until the product which separates on cooling is free from halogen (10–15 minutes).

It may be recrystallized from water, preferably with the addition of alcohol or acetone. It forms white exceedingly fine needles, which, on drying, assume a silky or paper-like appearance. It may be heated to 100°/15 mm. without loss of weight. It is soluble in water to the extent of about 3% at the ordinary temperature. When prepared by the above method 6 g. of gold afford about 9 g. of pure crystalline product.

(ii) A second method is available by which this compound may be obtained directly in one operation.

3 g. of gold in the form of chloroauric acid is dissolved in about 500 cc. of water and precipitated with ammonia. The fulminating gold is filtered off on an asbestos mat, washed with water and with alcohol and transferred to a 75 cc. beaker with 8 g. of succinimide, 14 cc. of water and 30 drops of ammonia. The mixture is warmed on the water bath until a clear dark red solution results. An equal volume of alcohol is added and the product allowed to crystallize. The solid matter is filtered off and recrystallized as described above.

*Example 6.*—Preparation and properties of the compound $[CH_3NH_2AuSu_3]$.

This substance is obtained from the compound $[(CH_3NH_2)_2AuSu_2]Cl$ by heating it with succinimide in aqueous alcohol. It crystallizes in short needles and is more soluble in water and aqueous alcohol than the ammonia derivative.

*Example 7.*—The acid $H[AuSu_2]$ and its salts.

(i) The diethylamine salt of this acid has already been described. The trimethylamine salt $NMe_3.HAuSu_2,H_2O$, is obtained by the action of 6 g. of trimethylamine (33% aqueous) on chloroauric acid (=3 g. of metallic gold), succinimide (8 g.) and alcohol (12 cc.). The solution becomes colourless when the addition of the trimethylamine is completed. On addition of 100 cc. of acetone, white crystalline leaflets separate. These are purified by recrystallization from a mixture of 10 cc. of alcohol and 5 cc. of acetone. They are exceedingly soluble in water, readily soluble in alcohol and slightly soluble in acetone. The aqueous solution decomposes on boiling, liberating metallic gold and the crystals turn purple on exposure to the light.

(ii) The triethylamine salt was prepared similarly and had similar properties.

(iii) The free acid is obtained by adding hydrochloric acid to an aqueous solution of one of the salts, when beautiful silky needles are precipitated. These consist of the free acid, $HAuSu_2$, which probably crystallizes with $3H_2O$. It turns purple when exposed to the light or dried in a vacuum desiccator, but it may be dried in air if care is taken to wash it free from all traces of acid. It may also be recrystallized from alcohol by working rapidly and avoiding too great an elevation of temperature. It is readily soluble in water from which it is re-precipitated by adding hydrochloric acid.

(iv) The potassium salt, $KAuSu_2$, is obtained from a solution of the acid in a little water with the calculated quantity of alcoholic potash. It is very soluble in water but easily salted out by potassium salts.

(v) The sodium salt, $NaAuSu_2$, is easily precipitated by salting out from aqueous solutions. It is also formed directly by the action of sodium ethoxide on chloroauric acid and succinimide in alcoholic solution. It crystallizes in needles.

*Example 8.*—The salts $Na[Cl_2AuSu_2]$ and $K[Cl_2AuSu_2]$.

These compounds are formed by the action of alkali hydroxides or carbonates on chloroauric acid and succinimide in aqueous or alcoholic solutions. They are pale yellow in colour and very readily soluble in water. With barium chloride they yield sparingly soluble pale yellow leaflets of the barium salt.

What I claim and desire to secure by Letters Patent is:—

1. A process for the preparation of gold compounds of succinimide consisting in the interaction in an aqueous solution of succinimide with an inorganic gold compound and a non-cyclic nitrogen base.

2. A process for the preparation of gold compounds of succinimide consisting in the interaction in an aqueous solution of succinimide with a reactive inorganic gold compound and ammonia.

3. A process for the preparation of gold compounds of succinimide consisting in the interaction in an aqueous solution of succinimide with a reactive inorganic gold compound and an alkyl amino.

4. An ammonium gold succinimide.

5. An alkyl amino gold succinimide.

6. A compound of a non-cyclic nitrogen base, gold and succinimide.

In testimony whereof, I affix my signature.

WILLIAM JACKSON POPE.